United States Patent Office 3,366,649
Patented Jan. 30, 1968

3,366,649
PROCESS FOR THE MANUFACTURE OF
1 - DEHYDRO - 17α - METHYL - TESTOSTERONE
Albert Wettstein, Riehen, and Charles Meystre, Arlesheim, Switzerland, assignors to Ciba Corporation, New York, N.Y., a corporation of Delaware
No Drawing. Original application May 29, 1956, Ser. No. 587,946. Divided and this application Sept. 14, 1962, Ser. No. 223,812
Claims priority, application Switzerland, Feb. 15, 1956, 29,930/56
3 Claims. (Cl. 260—397.4)

This is a division of Ser. No. 587,946, filed May 29, 1956, by A. Wettstein, C. Meystre, D. A. van Dorp and St. A. Szpilfogel.

This invention provides a process for the manufacture of 1-dehydro-17α-methyl-testosterone and its esters. These compounds are of great importance, because they show a high biological activity.

The process of the present invention consists in treating 17α-methyl-testosterone or an ester thereof or the corresponding saturated compounds with selenium dioxide in a tertiary aliphatic alcohol.

The selenium dioxide used as dehydrogenating agent is employed preferably in sublimed form. The dehydrogenation may be carried out in aqueous or non-aquous tertiary alcohols, such as tertiary butanol or tertiary amyl alcohol. There may also be added to the tertiary alcohol diluents, such as dioxane, glacial acetic acid, acetic acid anhydride, methanol, ethanol, isopropanol, polyvalent alcohols, such as ethylene glycol, benzene, toluene, hexane, ethyl-ether, dibutyl ether, tetrahydrofuran, Cellosolve, carbon tetrachloride, anisol, pyridine, ethyl acetate, acetonitrile and mixtures of these solvents.

The reaction is accelerated by the presence of an inorganic or organic acid, preferably an organic acid, such as acetic acid, propionic acid, or benzoic acid. The organic acid may in some cases at the same time serve as a solvent for the reaction components. If the reaction is performed in the presence of water the addition of an acid is not strictly necessary to accelerate the reaction.

The compound to be dehydrogenated is generally heated in one of the afore-said solvents with selenium dioxide at reflux temperature, if desired, also under pressure. For the introduction of one double bond the calculated quantity of the selenium compound or a certain excess is generally applied. An excess of the dehydrogenating agent can be eliminated after the reaction, e.g. by means of lead acetate, sulfur dioxide or other reducing agents. After completion of the reaction the mixture of dehydrogenating agent still present and formed selenium is filtered off and the reaction product is isolated by a method known per se from the filtrate. The removal of selenium and selenium derivatives is carried out by methods in themselves known.

In the reaction carried out according to the invention a mono-selenium derivative of the 1-dehydro-17α-methyl-testosterone compounds may be formed in addition to the 1-dehydro-steroids. These selenium derivatives may be converted into the corresponding 1-dehydro-steroids by thermic splitting.

The further purification of the reaction products may be carried out especially by chromatography, e.g. over aluminum oxide or silica gel, by distribution methods, e.g. according to the countercurrent method, or by separation by means of Girard reagents, such as trimethyl, ammonium or pyridinium acetic acid hydrazide. Following the purification or instead of it, the products may be crystallized from organic or aqueous organic solvents.

The 1-dehydro-17α-methyl-testosterone obtained according to the present process may be esterified according to methods known per se. In the esters the residues may be those of organic or inorganic acids e.g. aliphatic, alicyclic, aralyphatic, aromatic, or heterocyclic, carboxylic, thion-carboxylic, thiol-carboxylic, or sulfonic acids, preferably formic acid, acetic acid, chlor acetic acids, trifluoroacetic acid, propionic acid, butyric acids, valeric acids, trimethyl-acetic acid, diethyl acetic acid, caproic acids, oenanthic acids, caprilic acids, palmitic acids, crotonic acid, undecanic acid, undecylenic acid, oxalic acid, succinic acid, pimelic acid, maleic acid, lactic acid, carbamic acids, alkoxy carboxylic acids, β-cyclophentyl propionic acid, hexa-hydrobenzoic acid, benzoic acid, phenyl acetic acid, cyclohexyl acetic acid, γ-cyclohexyl butyric acid, phenyl propionic acids, trimethyl-gallic acid, phtalic acid, furane-2-carboxylic acid, isonicotinic acid, methane sulfonic acid, toluene sulfonic acid, sulfuric acids, hydrohalic acids, or phosphoric acids.

Alternatively the esters may be saponified in a manner known per se to give the 1-dehydro-17α-methyl-testosterone.

The following examples illustrates the invention, the temperatures being stated in ° C.

*Example*

A suspension of 1 g. of 17α-methyltestosterone and 330 mg. of selenium dioxide in 30 cc. of t-amyl alcohol and 0.3 cc. of acetic acid is heated, while stirring, at 70° in nitrogen atmosphere, to which, after 10 hours, another 300 mg. of selenium dioxide are added. After 24 hours the solution is cooled and removed from the separated selenium, washed with some acetone and the solvent is evaporated in vacuo. The brown residue is taken up in ethyl acetate. The ethyl acetate solutions are successively washed with dilute potassium bicarbonate solution, a freshly prepared icy cold ammonium sulfide solution, ice-cold dilute ammonia solution, water, dilute hydrochloric acid and water, dried and evaporated. The residue is dissolved in benzene and chromatographed over aluminum oxide. On recrystallization from acetone-ether mixture the evaporated benzene eluates yield the 1-dehydro-17α-methyl-testosterone with M.P. 163–164°.

From the further evaporated ether eluates monoselenium derivative of M.P. 282–284° is obtained on recrystallization from acetone; it gives the following analysis values.

$C_{20}H_{28}O_2Se$ calc.: C, 63.31; H, 7.43; Se, 20.81%. Found: C, 62.59; H, 7.21; Se, 19.95%.

Infrared spectrum in methylene chloride: bands among other values at $2.77\mu$, $6.08\mu$, $6.16\mu$, $6.25\mu$, $7.30\mu$, $8.87\mu$ and $10.61\mu$.

By sublimation of the mono selenium derivative in high-vacuum at about 230° a sublimate is obtained from which 1-dehydro-17α-methyl-testosterone can be isolated.

What is claimed is:

1. Process for the manufacture of a member selected from the group consisting of 1-dehydro-17α-methyl-testosterone and an ester thereof, wherein a member consisting of 17α-methyl-testosterone, an ester thereof and corresponding saturated compounds is treated with selenium dioxide in a tertiary aliphatic alcohol.

2. Process as claimed in claim 1, wherein 17α-methyl-testosterone is dehydrogenated with selenium dioxide in tertiary amyl alcohol with the addition of acetic acid at about 70° C., and 1-dehydro-17α-methyl-testosterone is ioslated from the reaction mixture.

3. Process as claimed in claim 2, wherein there is isolated the mono-selenium derivative of 1-dehydro-17α-methyl-testosterone from the reaction mixture.

References Cited

Meystre et al.: Helv. Chim. Acta., Feb. 9, 1956 (pp. 734–742).

Ringold et al.: J. Org. Chem., February 1956 (pp. 239–240).

ELBERT L. ROBERTS, *Primary Examiner.*

LEWIS GOTTS, *Examiner.*

G. E. LANDE, *Assistant Examiner.*